United States Patent
Zhao et al.

(10) Patent No.: US 10,046,987 B2
(45) Date of Patent: Aug. 14, 2018

(54) METHOD OF TREATMENT OF RADIOACTIVE WASTEWATER

(71) Applicant: TSINGHUA UNIVERSITY, Beijing (CN)

(72) Inventors: Xuan Zhao, Beijing (CN); Fuzhi Li, Beijing (CN); Meng Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 523 days.

(21) Appl. No.: 14/754,745

(22) Filed: Jun. 30, 2015

(65) Prior Publication Data
US 2015/0336815 A1   Nov. 26, 2015

Related U.S. Application Data

(63) Continuation-in-part of application No. PCT/CN2013/088178, filed on Nov. 29, 2013.

(30) Foreign Application Priority Data

Mar. 28, 2013  (CN) .......................... 2013 1 0103374

(51) Int. Cl.
   *C02F 1/44*        (2006.01)
   *C02F 1/469*       (2006.01)
   (Continued)

(52) U.S. Cl.
   CPC .............. *C02F 1/441* (2013.01); *B01D 61/48* (2013.01); *B01D 61/58* (2013.01); *C02F 1/4695* (2013.01);
   (Continued)

(58) Field of Classification Search
   CPC .................... C02F 1/441; C02F 1/4695; C02F 2101/46115; C02F 2101/006;
   (Continued)

(56) References Cited

U.S. PATENT DOCUMENTS 4,347,704 A * 9/1982 Marquardt ........... B01D 61/022
                                                203/DIG. 20
4,409,137 A * 10/1983 Mergan ............... B01F 13/1027
                                                159/11.1

(Continued)

FOREIGN PATENT DOCUMENTS

CN          101051534 A      10/2007
CN          101665277 A       3/2010
(Continued)

OTHER PUBLICATIONS

English language machine translation of CN 101665277 A, generated Dec. 13, 2017, original publication Mar. 10, 2010, PP1-7. (Year: 2010).*

(Continued)

*Primary Examiner* — David C Mellon
(74) *Attorney, Agent, or Firm* — Matthias Scholl, PC; Matthias Scholl

(57) ABSTRACT

A method of treatment of radioactive wastewater. The method includes: allowing radioactive wastewater to undergo reverse osmosis treatment and continuous electrodeionization treatment in sequence. The continuous electrodeionization treatment is carried out in a continuous electrodeionization unit including a continuous electrodeionization membrane stack including a dilute chamber and a concentrate chamber. The dilute chamber is filled with between 30 and 60 vol. % of a first strong-acid cation exchange resin, between 40 and 60 vol. % of a first strong-base anion exchange resin, and between 0 and 30 vol. % of a weak-base anion exchange resin. The concentrate chamber is filled with between 20 and 50 vol. % of a second strong-acid cation exchange resin, and the rest is a second strong-base anion exchange resin.

6 Claims, 1 Drawing Sheet

(51) Int. Cl.
*B01D 61/58* (2006.01)
*G21F 9/12* (2006.01)
*G21F 9/06* (2006.01)
*B01D 61/48* (2006.01)
*C02F 1/42* (2006.01)
*B01D 61/02* (2006.01)
*C02F 101/00* (2006.01)

(52) U.S. Cl.
CPC ............... *G21F 9/06* (2013.01); *G21F 9/12* (2013.01); *B01D 61/025* (2013.01); *C02F 2001/427* (2013.01); *C02F 2101/006* (2013.01); *C02F 2201/46115* (2013.01); *Y02A 20/131* (2018.01); *Y02A 20/134* (2018.01)

(58) Field of Classification Search
CPC ... C02F 2001/427; B01D 61/58; B01D 61/48; B01D 61/025; G21F 9/12; G21F 9/06; Y02A 20/134; Y02A 20/131
See application file for complete search history.

(56) References Cited

U.S. PATENT DOCUMENTS

| | | | | |
|---|---|---|---|---|
| 4,808,287 | A | * | 2/1989 | Hark ............... B01D 61/022 204/519 |
| 5,558,775 | A | * | 9/1996 | Busch, Jr. ............... B01D 61/04 210/241 |
| 5,858,191 | A | * | 1/1999 | DiMascio ............... B01D 61/48 204/524 |
| 6,312,577 | B1 | | 11/2001 | Ganzi et al. |
| 2002/0011413 | A1 | | 1/2002 | Dimascio et al. |

FOREIGN PATENT DOCUMENTS

| | | |
|---|---|---|
| CN | 102295374 A | 12/2011 |
| CN | 103177784 A | 6/2013 |
| JP | 2008-76054 A | 4/2008 |

OTHER PUBLICATIONS

Fu-Zhi Li et al., Removal of Co2+ and Sr2+ from a primary coolant by continuous electrodeionization packed with weak base anion exchange resin, Nuclear Technology, Oct. 2010, pp. 71-76, vol. 172, issue 1, Taylor & Francis, United Kingdom.

Xuan Zhao et al., Nuclide removal from the primary coolant of a nuclear power plant by continuous electrodeionization, J Tsinghua Univ(Sci & Tech), 2010, pp. 1429-1431, vol. 50, issue 9, Tsinghua University Press, China.

Xuan Zhao et al., Treatment of low level radioactive waste water, Aug. 15, 2011, pp. 10-13, Chinese Nuclear Society, China.

* cited by examiner

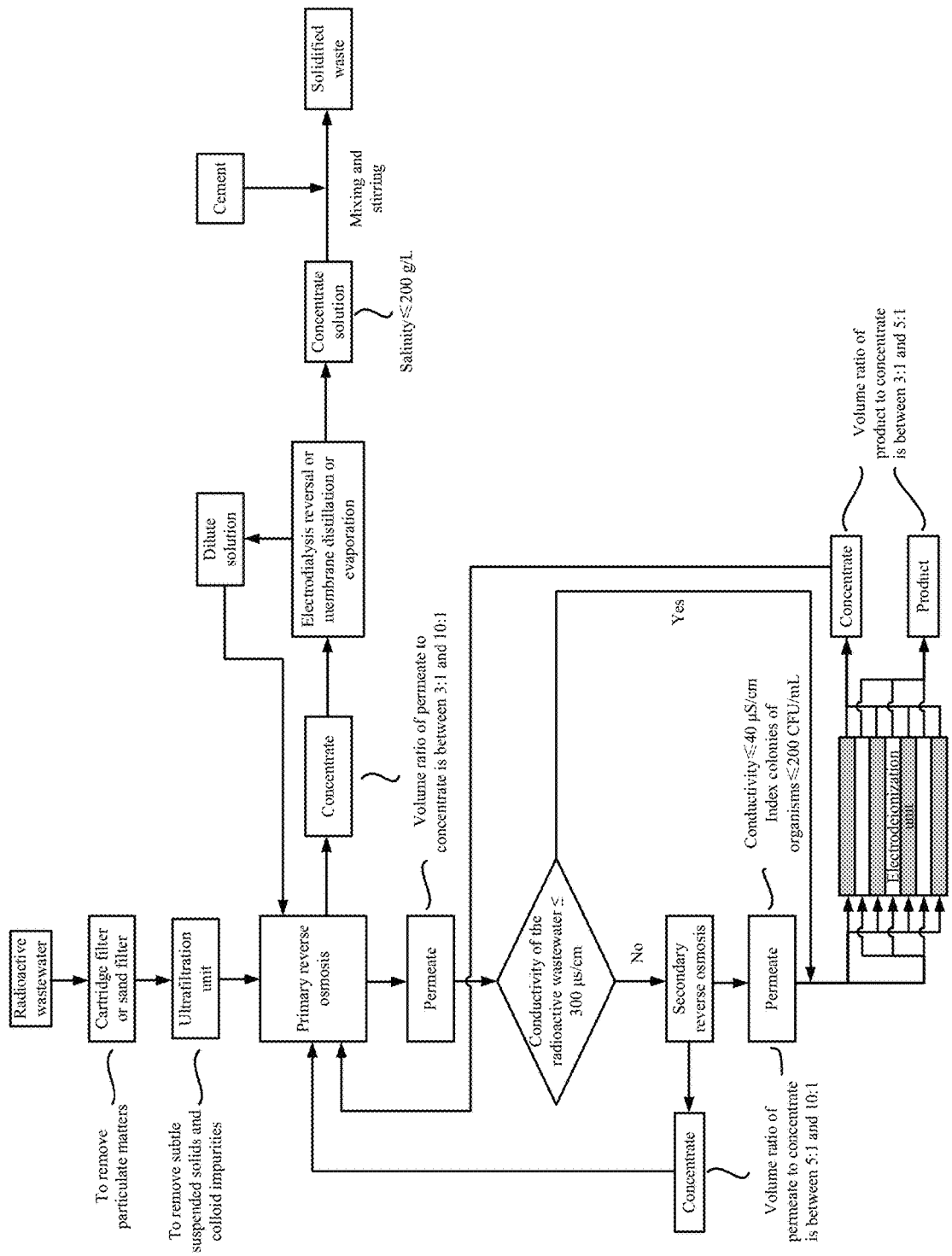

METHOD OF TREATMENT OF RADIOACTIVE WASTEWATER

CROSS-REFERENCE TO RELATED APPLICATIONS

This application is a continuation-in-part of International Patent Application No. PCT/CN2013/088178 with an international filing date of Nov. 29, 2013, designating the United States, now pending, and further claims priority benefits to Chinese Patent Application No. 201310103374.1 filed Mar. 28, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method of treatment of radioactive wastewater.

Description of the Related Art

Typically, radioactive wastewater is treated by evaporation and ion exchange. However, the process consumes a large amount of energy, produces a large number of radioactive byproducts, and involves expensive equipment. Conventionally, the evaporation treatment process runs under harsh environments and thus equipment involved therein tends to corrode. In addition, the ion exchange process produces radioactive spent resins as byproducts, which increases the difficulty of post-processing.

With the development of membrane technology, reverse osmosis has been introduced for wastewater treatment.

In recent years, continuous electrodeionization has been used for radioactive wastewater treatment. However, the resins filled in the membrane stack of a continuous electrodeionization unit do not have a strong selectivity for radionuclides, and the concentration of the nuclide ions is 4-5 orders of magnitude lower than that of non-radioactive ions, leading to a low removal efficiency of the nuclide ions. As a result, the effluent quality cannot meet the specified discharge standards.

SUMMARY OF THE INVENTION

In view of the above-described problems, it is one objective of the invention to provide a method of treatment of radioactive wastewater based on reverse osmosis plus continuous electrodeionization process. The reverse osmosis can remove a majority of radionuclides and salts in the wastewater, and the continuous electrodeionization is designed for polishing treatment, so that the effluent satisfies the discharge standard.

The continuous electrodeionization employs ion exchange resins filled between the anion and cation exchange membranes. The anion exchange membrane and the cation exchange membrane are disposed alternately. When nuclide ions in the wastewater are adsorbed by the resins, with the applied electric field, the ions are accumulated in the concentrate chamber via the anion and cation exchange membranes, such that the product water meets the discharge standard. In the presence of electric field, water molecule decomposes hydrogen ion and hydroxyl ion to regenerate ion exchange resins. The continuous electrodeionization reduces the specific activity of the feed water, regenerates the resins with the help of the direct current, without the addition of external acid or base, and produces no radioactive resins theoretically.

To achieve the above objective, in accordance with one embodiment of the invention, there is provided a method of treatment of radioactive wastewater, the method comprising: allowing the radioactive wastewater to undergo reverse osmosis treatment and continuous electrodeionization treatment in sequence. The continuous electrodeionization treatment is carried out in a continuous electrodeionization unit comprising a continuous electrodeionization membrane stack comprising a dilute chamber and a concentrate chamber; the dilute chamber is filled with between 30 and 60 vol. % of a first strong-acid cation exchange resin, between 40 and 60 vol. % of a first strong-base anion exchange resin, and between 0 and 30 vol. % of a weak-base anion exchange resin; and the concentrate chamber is filled with between 20 and 50 vol. % of a second strong-acid cation exchange resin, and the rest is a second strong-base anion exchange resin.

In a class of this embodiment, the method comprises:
1) allowing the radioactive wastewater to pass through a cartridge filter or a sand filter to remove particulate matters, and then allowing the radioactive wastewater to pass through an ultrafiltration unit to remove subtle suspended solids and colloid impurities;
2) allowing the radioactive wastewater to undergo a primary reverse osmosis and a secondary reverse osmosis to remove part of salts and radionuclides, and returning the concentrate from the secondary reverse osmosis to the primary reverse osmosis; wherein a conductivity of the permeate from the secondary reverse osmosis is less than or equal to 40 $\mu$S/cm; and
3) introducing the permeate from 2) to the continuous electrodeionization unit for continuous electrodeionization treatment.

In a class of this embodiment, in 2), a volume ratio of the permeate to the concentrate from the primary reverse osmosis is between 3:1 and 10:1, a volume ratio of the permeate to the concentrate from the secondary reverse osmosis is between 5:1 and 10:1, and index colonies of microorganisms are less than or equal to 200 CFU/mL.

In a class of this embodiment, in 3), a volume ratio of a product to the concentrate from the continuous electrodeionization unit is between 3:1 and 5:1.

In a class of this embodiment, the method further comprises:
4) concentrating the concentrate from the primary reverse osmosis to yield a dilute solution and a concentrate solution, and returning the dilute solution and concentrate obtained in 3) to 2) for further treatment; and
5) mixing and stirring the concentrate solution obtained in 4) with cement to yield a solidified waste.

In a class of this embodiment, in 4), the concentrating of the concentrate is achieved through electrodialysis reversal, membrane distillation, or evaporation; resulting concentrate has a salinity less than or equal to 200 g/L, and resulting the dilute solution is returned to 2) for the primary reverse osmosis.

In a class of this embodiment, when a conductivity of the radioactive wastewater is less than or equal to 300 $\mu$S/cm, the permeate from the primary reverse osmosis is directly introduced to 3) for the continuous electrodeionization treatment in the absence of 2).

Advantages of the method of treatment of radioactive wastewater according to embodiments of the invention are summarized as follows.

First, the method features high polishing properties, and can remove extremely low concentration of radionuclide ions.

1. The method employs two-stage reverse osmosis as a pretreatment of the continuous electrodeionization, so that the influent to the continuous electrodeionization unit has high purity, thereby buffering the competition between non-radioactive ions and radionuclide ions, enhancing the current utilization, and improving the removal efficiency of the radionuclide ions even in an extremely low concentration. 2. The membrane stack of the continuous electrodeionization unit is upgraded, the polymer percentage in the membrane stack is optimized, and a weak-dissociation polymer is substituted for part of the strong-dissociation anion exchange polymer of the membrane stack, which improves the selectivity of the continuous electrodeionization membrane stack for the trace radionuclides. Based on the two improvements, the method can remove extremely low concentration of radionuclides in the wastewater, and the final effluent meets the discharge standard.

Compared with conventional purification modes such as reverse osmosis plus ion exchange, the effluent quality and the radionuclide removal efficiency have been improved greatly. The reverse osmosis can reduce the radioactivity of wastewater to around 30-100 Bq/L (gross β radioactivity), after evaporation, the radioactivity can decrease to around 10-15 Bq/L (gross β radioactivity), and with ion exchange for polishing treatment, the radioactivity can reach around 10 Bq/L (gross β radioactivity). By the treatment with reverse osmosis plus continuous electrodeionization, the radioactivity can be less than 1 Bq/L (gross β radioactivity), which is far below the existing concentration.

Second, the method reduces the yield of radioactive waste. When the membrane technology is employed to treat radioactive wastewater, the liquid radioactive waste is mainly concentrate generated from reverse osmosis. Improving the ratio of the permeate to concentrate can deduce the yield of the liquid waste, but also decreases the removal efficiency of the nuclides, so that the specific activity of the final effluent cannot meet the discharge standard. The invention combines the reverse osmosis and continuous electrodeionization, and the latter can ensure the effluent quality, so that in the process of reverse osmosis, the ratio of the permeate to concentration water can be appropriately increased, which is beneficial to the decrease of the yield of the liquid waste. As far as conventional membrane technology is concerned, to ensure the effluent quality, in addition to the reserve osmosis, ion exchange resins are employed as a polishing treatment, which inevitably generates a large amount of solid radioactive wastes such as ion exchange resins. The invention adopts the continuous electrodeionization to substitute the ion exchange resins for the polishing treatment, and the yield of the radioactive spent resin accounts for only 5% of conventional two-stage reverse osmosis plus ion exchange process. In addition, the nuclides do not accumulate on the resins, so that the specific activity of the spent resins is much less than that of conventional spent resins resulting from the conventional two-stage reverse osmosis plus ion exchange process.

BRIEF DESCRIPTION OF THE DRAWINGS

Third, the equipment involved in the invention is superior to conventional purification devices in dimensions, practicability, maintainability, and power and fuel consumption.

The invention is described hereinbelow with reference to accompanying drawings, in which the sole FIGURE is a flow chart of the process of treating radioactive water according to one embodiment of the invention.

DETAILED DESCRIPTION OF THE EMBODIMENTS

For further illustrating the invention, experiments detailing a method of treatment of radioactive wastewater are described below. It should be noted that the following examples are intended to describe and not to limit the invention.

A method of treatment of radioactive wastewater is summarized as follows.

1) Allowing the radioactive wastewater to pass through a cartridge filter or a sand filter to remove particulate matters, and then allowing the radioactive wastewater to pass through an ultrafiltration unit to remove subtle suspended solids and colloid impurities. The conductivity of the wastewater from the ultrafiltration unit is measured. When the conductivity is greater than 300 μS/cm, the wastewater is introduced to the following step 2) for two-stage reverse osmosis treatment. When the conductivity is less than or equal to 300 μS/cm, the wastewater is introduced to the following step 2) for primary reverse osmosis treatment and then directly to step 3).

2) Allowing the radioactive wastewater from 1), the concentrate from the secondary reverse osmosis as well as from 2) and 3) to undergo a primary reverse osmosis to remove part of salts and radionuclides. The volume ratio of the permeate to concentrate from the primary reverse osmosis is between 3:1 and 10:1, and the permeate water is introduced for secondary reverse osmosis, the concentrate is introduced to 4). The secondary reverse osmosis can further remove the salts and radionuclides in the wastewater. The volume ratio of the permeate to the concentrate from the secondary reverse osmosis is between 5:1 and 10:1, and the conductivity of the permeate water from the secondary reverse osmosis is less than or equal to 40 μS/cm, index colonies of microorganisms are less than or equal to 200 CFU/mL. The permeate water from the secondary reverse osmosis is introduced to 3), and the concentrate is allowed to return for primary reverse osmosis.

3) Introducing the radioactive wastewater from 2) to the continuous electrodeionization unit for continuous electrodeionization treatment to remove the nuclide residues. The volume ratio of the product to concentrate from the continuous electrodeionization unit is between 3:1 and 5:1. The anode of the continuous electrodeionization membrane stack of the continuous electrodeionization unit adopts a pure titanium plate electrode, the cathode thereof employs a stainless steel plate. The dilute chamber is filled with between 30 and 60 vol. % of a strong-acid cation exchange resin, between 40 and 60 vol. % of a strong-base anion exchange resin, and between 0 and 30 vol. % of a weak-base anion exchange resin; and the concentrate chamber is filled with between 20 and 50 vol. % of a strong-acid cation exchange resin, and the rest is a strong-base anion exchange resin. The product from the continuous electrodeionization unit meets the wastewater discharge standard.

4) Concentrating concentrate from the primary reverse osmosis to yield a dilute solution and a concentrate solution, and returning the dilute solution and concentrate from 3) to 2) for further treatment. The concentrating treatment is achieved through electrodialysis reversal, membrane distillation, or evaporation, and the resulting concentrate has a salinity less than or equal to 200 g/L, which is introduced to 5).

5) Mixing and stirring the concentrate solution obtained in 4) with cement to yield a solidified waste.

It should be noted that, prior to each starting of the treatment process, the membrane module is first washed. After the treatment process is completed, the membrane module is on-line washed again by non-radioactive water or water produced by the process with parameters unchanged.

Example 1

Radioactive wastewater to be treated had a radioactivity of 7000 Bq/L and a conductivity of 850 μS/cm. Prior to starting the treatment process, the membrane module was first washed. After the treatment process was completed, the membrane module was on-line washed again by non-radioactive water or water produced by the process with parameters unchanged. The radioactive wastewater was filtered using a cartridge filter or a sand filter, and the effluent was introduced for a primary reverse osmosis. The volume ratio of the permeate to the concentrate from the primary reverse osmosis was 5:1, and the conductivity of the permeate was 40 μS/cm. The permeate was allowed to undergo the secondary reverse osmosis, and the concentrate was introduced to an electrodialysis reversal unit. The volume ratio of the permeate to the concentrate from the secondary reverse osmosis was 5:1. The concentrate returned to the primary reverse osmosis; the radioactivity of the permeate water decreased to 200 Bq/L and the conductivity thereof was 11 μS/cm, and the index colonies of microorganisms was less than 100 CFU/mL. The permeate from the secondary reverse osmosis was introduced to a continuous electrodeionization unit. The anode of the continuous electrodeionization membrane stack of the continuous electrodeionization unit adopts a pure titanium plate electrode, the cathode thereof employs a stainless steel plate. The dilute chamber was filled with 60 vol. % of a first strong-acid cation exchange resin and 40 vol. % of a first strong-base anion exchange resin. The concentrate chamber was filled with 50 vol. % of a second strong-acid cation exchange resin, and the rest was a second strong-base anion exchange resin. The volume ratio of the product to the concentrate from the continuous electrodeionization unit was 3:1. The radioactivity of the product decreased to less than 5 Bq/L, which meets the wastewater discharge standard. The concentrate was returned to the primary reverse osmosis unit via a booster pump.

The concentrate from the primary reverse osmosis was introduced to the electrodialysis reversal unit, and the dilute solution from the electrodialysis reversal unit was introduced to the primary reverse osmosis unit via the booster pump. The salinity of the concentrate was controlled to be less than 200 g/L. The concentrate was conveyed to a 200 L standard barrel filled with cement via a charging pump. The concentrate solution flowed into the standard barrel and mixed with the cement to yield a solidified waste.

For safety consideration, conservatively, the resin in the continuous electrodeionization unit is replaced every year. The production rate of spent radioactive resins of the invention is less than 5% of the conventional ion exchange process which means an obvious reduction of radioactive waste. In addition, the nuclides do not accumulate on the resins, so that the specific activity of the spent resins is much less than that in the conventional ion exchange process.

Example 2

Radioactive wastewater to be treated had a radioactivity of 7000 Bq/L and a conductivity of 850 μS/cm. Prior to starting the treatment process, the membrane module was first washed. After the treatment process was completed, the membrane module was on-line washed again by non-radioactive water or permeate produced by the process with parameters unchanged. The radioactive wastewater was filtered using a cartridge filter or a sand filter, and the effluent was introduced for a primary reverse osmosis. The volume ratio of the permeate to the concentrate from the primary reverse osmosis was 3:1, and the conductivity of the permeate was 30 μS/cm. The permeate was allowed to undergo the secondary reverse osmosis, and the concentrate was introduced to an evaporation unit. The volume ratio of the permeate to the concentrate from the secondary reverse osmosis was 10:1. The concentrate returned to the primary reverse osmosis; the radioactivity of the permeate decreased to 100 Bq/L and the conductivity thereof was 15 μS/cm, and the index colonies of microorganisms was less than 100 CFU/mL. The permeate from the secondary reverse osmosis was introduced to a continuous electrodeionization unit. The anode of the continuous electrodeionization membrane stack of the continuous electrodeionization unit adopts a pure titanium plate electrode, the cathode thereof employs a stainless steel plate. The dilute chamber was filled with 30 vol. % of a first strong-acid cation exchange resin, 60 vol. % of a first strong-base anion exchange resin, and 10 vol. % of a weak-base anion exchange resin. The concentrate chamber was filled with 30 vol. % of a second strong-acid cation exchange resin, and the rest was a second strong-base anion exchange resin. The volume ratio of the product permeate to the concentrate from the continuous electrodeionization unit was 5:1. The radioactivity of the product decreased to less than 1 Bq/L, which meets the wastewater discharge standard. The concentrate was returned to the primary reverse osmosis unit via a booster pump.

The concentrate from the primary reverse osmosis was introduced to an evaporation unit, and the residual solution from the evaporation unit was conveyed to a 200 L standard barrel filled with cement via a charging pump, where the residual solution was mixed with the cement to yield a solidified waste. The condensate liquid from the evaporation was returned to the primary reverse osmosis unit via the booster pump.

For safety consideration, conservatively, the resin in the continuous electrodeionization unit is replaced every year. The production rate of spent radioactive resins of the invention is less than 5% of the conventional ion exchange process, which means an obvious reduction of radioactive waste. In addition, the nuclides do not accumulate on the resins, so that the specific activity of the resins is much less than that in the conventional ion exchange process.

Example 3

Radioactive wastewater to be treated had a radioactivity of 5000 Bq/L and a conductivity of 1500 μS/cm. Prior to starting the treatment process, the membrane module was first washed. After the treatment process was completed, the membrane module was on-line washed again by non-radioactive water or permeate produced by the process with parameters unchanged. The radioactive wastewater was filtered using a cartridge filter or a sand filter, and the effluent was introduced for a primary reverse osmosis. The volume ratio of the permeate to the concentrate from the primary reverse osmosis was 10:1, and the conductivity of the permeate was 100 μS/cm. The permeate was allowed to undergo the secondary reverse osmosis, and the concentrate was introduced to an evaporation unit. The volume ratio of the permeate to the concentrate from the secondary reverse osmosis was 5:1. The concentrate returned to the primary reverse osmosis; the radioactivity of the permeate decreased to 100 Bq/L and the conductivity thereof was 15 µS/cm, and the index colonies of microorganisms was less than 100 CFU/mL. The permeate from the secondary reverse osmosis was introduced to a continuous electrodeionization unit. The anode of the continuous electrodeionization membrane stack of the continuous electrodeionization unit adopts a pure titanium plate electrode, the cathode thereof employs a stainless steel plate. The dilute chamber was filled with 30 vol. % of a first strong-acid cation exchange resin, 40 vol. % of a first strong-base anion exchange resin, and 30 vol. % of a weak-base anion exchange resin. The concentrate chamber was filled with 20 vol. % of a second strong-acid cation exchange resin, and the rest was a second strong-base anion exchange resin. The volume ratio of the product to concentrate from the continuous electrodeionization unit was 3:1. The radioactivity of the product decreased to less than 1 Bq/L, which meets the wastewater discharge standard. The concentrate was returned to the primary reverse osmosis unit via a booster pump.

The concentrate from the primary reverse osmosis was introduced to a membrane distillation unit. The salinity of the concentrate was controlled to be less than 200 g/L. The concentrate was conveyed to a 200 L standard barrel filled with cement via a charging pump. The concentrate solution flowed into the standard barrel and mixed with the cement to yield a solidified waste. The condensate liquid from the membrane distillation was returned to the primary reverse osmosis unit via the booster pump.

For safety consideration, conservatively, the resin in the continuous electrodeionization unit is replaced every year. The production rate of spent radioactive resins of the invention is less than 5% of the conventional ion exchange process, which means an obvious reduction of radioactive waste. In addition, the nuclides do not accumulate on the resins, so that the specific activity of the resins is much less than that in the conventional ion exchange process.

Example 4

Radioactive wastewater to be treated had a radioactivity of 450 Bq/L and a conductivity of 300 µS/cm. Prior to starting the treatment process, the membrane module was first washed. After the treatment process was completed, the membrane module was on-line washed again by non-radioactive water or permeate produced by the process with parameters unchanged. The radioactive wastewater was filtered using a cartridge filter or a sand filter, and the effluent was introduced for a primary reverse osmosis. The volume ratio of the permeate to the concentrate from the primary reverse osmosis was 5:1. The concentrate was introduced to an electrodialysis reversal unit. The radioactivity of the permeate decreased to 40 Bq/L and the conductivity thereof was 20 µS/cm, and the index colonies of microorganisms were less than 100 CFU/mL. The permeate from the secondary reverse osmosis was introduced to a continuous electrodeionization unit. The anode of the continuous electrodeionization membrane stack of the continuous electrodeionization unit adopts a pure titanium plate electrode, the cathode thereof employs a stainless steel plate. The dilute chamber was filled with 40 vol. % of a first strong-acid cation exchange resin, 50 vol. % of a first strong-base anion exchange resin, and 10 vol. % of a weak-base anion exchange resin. The concentrate chamber was filled with 20 vol. % of a second strong-acid cation exchange resin, and the rest was a second strong-base anion exchange resin. The volume ratio of the product to concentrate from the continuous electrodeionization unit was 3:1. The radioactivity of the product decreased to less than 5 Bq/L, which meets the wastewater discharge standard. The concentrate was returned to the primary reverse osmosis unit via a booster pump.

The concentrate from the primary reverse osmosis was introduced to an electrodialysis reversal unit. The salinity of the concentrate was controlled to be less than 200 g/L. The concentrate was conveyed to a 200 L standard barrel filled with cement via a charging pump. The concentrate solution flowed into the standard barrel and mixed with the cement to yield a solidified waste. The dilute liquid from the electrodialysis reversal unit was returned to the primary reverse osmosis unit via the booster pump.

For safety consideration, conservatively, the resin in the continuous electrodeionization unit is replaced every year. The production rate of spent radioactive resins of the invention is less than 5% of the conventional ion exchange process, which means an obvious reduction of radioactive waste. In addition, the nuclides do not accumulate on the resins, so that the specific activity of the resins is much less than that in the conventional ion exchange process.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of treatment of radioactive wastewater, the method comprising:
   1) treating the radioactive wastewater by primary reverse osmosis to yield a first permeate and a first concentrate;
   2) when an electrical conductivity of the first permeate is larger than 300 µS/cm, treating the first permeate by secondary reverse osmosis to yield a second permeate and a second concentrate;
   3) when the electrical conductivity of the first permeate is smaller than or equal to 300 µS/cm, treating the first permeate in a continuous electrodeionization unit, or when the electrical conductivity of the first permeate is larger than 300 µS/cm, treating the second permeate in the continuous electrodeionization unit, to yield a product and a third concentrate; wherein the continuous electrodeionization unit comprises a continuous electrodeionization membrane stack comprising a dilute-solution chamber and a concentrate chamber; the product is generated in the dilute-solution chamber and the third concentrate is generated in the concentrate chamber; the dilute-solution chamber is filled with between 30 and 40 vol. % of a first strong-acid cation exchange resin, between 50 and 60 vol. % of a first strong-base anion exchange resin, and 10 vol. % of a weak-base anion exchange resin; and the concentrate chamber is filled with a combination of a second strong-acid cation exchange resin and a second strong-base anion exchange resin, and the second strong-acid cation exchange resin occupies between 20 and 50 vol. % of the combination.

2. The method of claim 1, comprising:
   before 1), passing the radioactive wastewater through a cartridge filter or a sand filter to remove particulate matters to obtain a treated radioactive wastewater, and then passing the treated radioactive wastewater through an ultrafiltration unit to remove suspended solids and colloid impurities; and returning the second concentrate from the secondary reverse osmosis to the primary reverse osmosis; wherein the primary reverse osmosis and the secondary reverse osmosis remove a portion of salts and radionuclides from the radioactive wastewater; and the electrical conductivity of the second permeate is less than or equal to 40 μS/cm.

3. The method of claim 2, wherein a volume ratio of the first permeate to the first concentrate is between 3:1 and 10:1, a volume ratio of the second permeate to the second concentrate is between 5:1 and 10:1, and microorganisms in the second permeate are in a concentration of less than or equal to 200 CFU/mL.

4. The method of claim 2, wherein a volume ratio of the product to the third concentrate is between 3:1 and 5:1.

5. The method of claim 2, further comprising:
4) concentrating the first concentrate to yield a dilute solution and a concentrate solution, and returning the dilute solution and the third concentrate to the primary reverse osmosis for further treatment; and
5) mixing and stirring the concentrate solution obtained in 4) with cement to yield a solidified waste.

6. The method of claim 5, wherein in 4), the concentrating of the first concentrate is achieved through membrane distillation or evaporation; and a salinity of the concentrate solution is less than or equal to 200 g/L.

* * * * *